(12) United States Patent
Juchem et al.

(10) Patent No.: US 9,298,410 B2
(45) Date of Patent: Mar. 29, 2016

(54) EXPOSING NETWORK PRINTERS TO WI-FI CLIENTS

(75) Inventors: Murilo Juchem, Porto Alegre (BR); Deny Joao Correa Azzolin, Porto Alegre (BR); Fernando Luis Caprio da Costa, Jr., Porto Alegre (BR)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 44 days.

(21) Appl. No.: 14/397,537

(22) PCT Filed: Jun. 26, 2012

(86) PCT No.: PCT/US2012/044098
§ 371 (c)(1),
(2), (4) Date: Oct. 28, 2014

(87) PCT Pub. No.: WO2014/003712
PCT Pub. Date: Jan. 3, 2014

(65) Prior Publication Data
US 2015/0103373 A1    Apr. 16, 2015

(51) Int. Cl.
*G06F 15/00* (2006.01)
*G06F 3/12* (2006.01)
(Continued)

(52) U.S. Cl.
CPC ............ *G06F 3/1292* (2013.01); *G06F 3/1203* (2013.01); *G06F 3/1204* (2013.01); *G06F 3/1226* (2013.01); *G06F 3/1236* (2013.01); *G06F 3/1271* (2013.01); *G06F 3/1286* (2013.01); *G06F 3/1288* (2013.01);
(Continued)

(58) Field of Classification Search
CPC ............................ G06F 3/1208; G06F 3/1203
USPC ......................................................... 358/1.15
See application file for complete search history.

(56) References Cited

U.S. PATENT DOCUMENTS

| 5,090,231 A | 2/1992 | Gallagher |
| 5,287,194 A | 2/1994 | Lobiondo |
| 5,559,993 A | 9/1996 | Elliott et al. |

(Continued)

FOREIGN PATENT DOCUMENTS

| CN | 101004668 | 7/2007 |
| CN | 101201727 | 6/2008 |

(Continued)

OTHER PUBLICATIONS

Develop, "Develop Joins Cloud Printing Alliance," (Research Paper), 2012, available at http://www.develop.de/en/0/143_news-detail.htm.

(Continued)

*Primary Examiner* — Saeid Ebrahimi Dehkordy
(74) *Attorney, Agent, or Firm* — Trop, Pruner & Hu, P.C.

(57) ABSTRACT

In an embodiment, a processor-readable medium stores code representing instructions that when executed by a processor cause the processor to receive a printer discovery request from a WI-FI client. The instructions further cause the processor to forward the printer discovery request and an agent identification to an enterprise network server, and receive from the enterprise network server, a list of printers associated with the agent identification. The instructions also cause the processor to expose the list of printers to the WI-FI client.

18 Claims, 5 Drawing Sheets

(51) Int. Cl.
*H04L 29/08* (2006.01)
*H04W 48/14* (2009.01)

(52) U.S. Cl.
CPC .............. *H04L 67/16* (2013.01); *H04W 48/14* (2013.01); *G06F 3/122* (2013.01)

(56) References Cited

U.S. PATENT DOCUMENTS

| | | | |
|---|---|---|---|
| 5,832,191 A | 11/1998 | Thorne |
| 5,862,471 A | 1/1999 | Tiedemann et al. |
| 6,285,889 B1 | 9/2001 | Nykanen |
| 6,335,795 B1 | 1/2002 | Neuhard et al. |
| 6,337,745 B1 | 1/2002 | Aiello, Jr. et al. |
| 6,359,642 B1 | 3/2002 | Smith |
| 6,417,913 B2 | 7/2002 | Tanaka |
| 6,516,157 B1 | 2/2003 | Maruta et al. |
| 6,552,813 B2 | 4/2003 | Yacoub |
| 6,560,621 B2 | 5/2003 | Barile |
| 6,606,162 B1 | 8/2003 | Simpson |
| 6,621,589 B1 | 9/2003 | Al-Kazily et al. |
| 6,650,433 B1 | 11/2003 | Keane et al. |
| 6,650,946 B1 | 11/2003 | Bauer |
| 6,678,750 B2 | 1/2004 | Tagg et al. |
| 6,748,471 B1 | 6/2004 | Keeney |
| 6,751,732 B2 | 6/2004 | Strobel et al. |
| 6,757,070 B1 | 6/2004 | Lin et al. |
| 6,806,976 B1 | 10/2004 | Suyehira |
| 6,859,832 B1 | 2/2005 | Gecht et al. |
| 6,909,518 B2 | 6/2005 | Miller et al. |
| 6,978,299 B1 | 12/2005 | Lodwick |
| 6,980,319 B2 | 12/2005 | Ohta |
| 6,993,562 B2 | 1/2006 | Treptow et al. |
| 6,996,611 B1 | 2/2006 | Muto |
| 7,019,861 B2 | 3/2006 | Aagesen |
| 7,051,095 B1 | 5/2006 | Cantwell |
| 7,064,856 B2 | 6/2006 | Fu et al. |
| 7,088,462 B2 | 8/2006 | Bhogal et al. |
| 7,096,265 B2 | 8/2006 | Simpson et al. |
| 7,106,470 B2 | 9/2006 | Parry |
| 7,113,300 B2 | 9/2006 | Strobel et al. |
| 7,120,667 B2 | 10/2006 | Derocher et al. |
| 7,143,210 B2 | 11/2006 | Ferlitsch |
| 7,167,264 B2 | 1/2007 | Takamiya |
| 7,167,930 B2 | 1/2007 | Reilly |
| 7,184,159 B2 | 2/2007 | Bergstrand |
| 7,187,462 B2 | 3/2007 | Oakeson et al. |
| 7,191,327 B2 | 3/2007 | Viljoen et al. |
| 7,212,297 B2 | 5/2007 | Liang et al. |
| 7,218,411 B2 | 5/2007 | Hohensee et al. |
| 7,225,220 B2 | 5/2007 | Gonzalez et al. |
| 7,231,605 B1 | 6/2007 | Ramakesavan |
| 7,239,877 B2 | 7/2007 | Corneille et al. |
| 7,256,900 B1 | 8/2007 | Hanaoka |
| 7,265,867 B2 | 9/2007 | Fu et al. |
| 7,272,407 B2 | 9/2007 | Strittmatter et al. |
| 7,315,824 B2 | 1/2008 | Chen et al. |
| 7,352,485 B2 | 4/2008 | Kinoshita |
| 7,365,872 B2 | 4/2008 | Lawrence et al. |
| 7,414,747 B2 | 8/2008 | Ohta |
| 7,441,003 B1 | 10/2008 | Takeda et al. |
| 7,576,883 B2 | 8/2009 | Ragnet et al. |
| 7,647,074 B2 | 1/2010 | McCoog et al. |
| 7,656,547 B2 | 2/2010 | Kuo et al. |
| 7,707,081 B2 | 4/2010 | Evans et al. |
| 7,760,385 B2 | 7/2010 | Yamaguchi |
| 7,791,747 B2 | 9/2010 | Roksz |
| 7,800,768 B2 | 9/2010 | Yamada |
| 7,839,521 B2 | 11/2010 | Bard et al. |
| 7,853,946 B2 | 12/2010 | Minagawa |
| 7,941,458 B2 | 5/2011 | Torr |
| 7,945,573 B1 | 5/2011 | Barnes et al. |
| 8,010,469 B2 | 8/2011 | Kapoor et al. |
| 8,045,485 B2 | 10/2011 | Shima et al. |
| 8,090,324 B2 | 1/2012 | Kusakari |
| 8,115,943 B2 | 2/2012 | Ohishi et al. |
| 8,126,904 B1 | 2/2012 | Bettinger et al. |
| 8,179,549 B1 | 5/2012 | Evans |
| 8,223,355 B2 | 7/2012 | McCoog et al. |
| 8,253,956 B2 | 8/2012 | Han |
| 8,467,079 B2 | 6/2013 | Carroll |
| 8,468,240 B2 | 6/2013 | Prati |
| 8,508,598 B2 | 8/2013 | Louks et al. |
| 8,570,566 B2 | 10/2013 | St. Laurent et al. |
| 2001/0013053 A1 | 8/2001 | Yamazaki |
| 2001/0043357 A1 | 11/2001 | Owa et al. |
| 2002/0002592 A1 | 1/2002 | Aoki et al. |
| 2002/0013869 A1 | 1/2002 | Taniguchi et al. |
| 2002/0044299 A1 | 4/2002 | Iwase et al. |
| 2002/0078160 A1 | 6/2002 | Kemp et al. |
| 2002/0083121 A1 | 6/2002 | Chang |
| 2003/0002072 A1 | 1/2003 | Berkema et al. |
| 2003/0036350 A1 | 2/2003 | Jonsson |
| 2003/0053122 A1 | 3/2003 | Kinoshita |
| 2003/0078987 A1 | 4/2003 | Serebrennikov |
| 2003/0107762 A1 | 6/2003 | Kinoshita et al. |
| 2003/0115199 A1 | 6/2003 | Ochiai |
| 2003/0115458 A1 | 6/2003 | Song |
| 2003/0160997 A1 | 8/2003 | Kimura |
| 2003/0184557 A1 | 10/2003 | Wen |
| 2003/0227641 A1 | 12/2003 | Edmonds et al. |
| 2003/0231328 A1 | 12/2003 | Chapin et al. |
| 2004/0024787 A1 | 2/2004 | Edwards et al. |
| 2004/0039647 A1 | 2/2004 | Roche et al. |
| 2004/0066530 A1 | 4/2004 | Wu et al. |
| 2004/0100505 A1 | 5/2004 | Cazier |
| 2004/0125145 A1 | 7/2004 | Sano et al. |
| 2004/0125401 A1 | 7/2004 | Earl et al. |
| 2004/0130744 A1 | 7/2004 | Wu et al. |
| 2004/0137855 A1 | 7/2004 | Wiley et al. |
| 2004/0137928 A1 | 7/2004 | Biundo |
| 2004/0162804 A1 | 8/2004 | Strittmatter et al. |
| 2004/0176117 A1 | 9/2004 | Strittmatter et al. |
| 2004/0176118 A1 | 9/2004 | Strittmatter et al. |
| 2004/0203439 A1 | 10/2004 | Zerressen |
| 2004/0218201 A1 | 11/2004 | Lermant et al. |
| 2004/0218213 A1 | 11/2004 | Shimizu et al. |
| 2004/0230646 A1 | 11/2004 | Clough et al. |
| 2004/0249934 A1 | 12/2004 | Anderson et al. |
| 2004/0252329 A1 | 12/2004 | Sorenson |
| 2004/0252332 A1 | 12/2004 | McCoog et al. |
| 2004/0253990 A1 | 12/2004 | McCoog et al. |
| 2005/0073522 A1 | 4/2005 | Aholainen |
| 2005/0088681 A1 | 4/2005 | Hosoda |
| 2005/0099639 A1 | 5/2005 | Payne et al. |
| 2005/0111856 A1 | 5/2005 | Kawai |
| 2005/0259287 A1 | 11/2005 | Watanabe |
| 2005/0270569 A1 | 12/2005 | Hayashi |
| 2006/0012828 A1 | 1/2006 | Ohta |
| 2006/0028681 A1 | 2/2006 | Aagesen |
| 2006/0044598 A1 | 3/2006 | Etelapera |
| 2006/0158681 A1 | 7/2006 | Yorimoto et al. |
| 2006/0258341 A1 | 11/2006 | Miller et al. |
| 2006/0259394 A1 | 11/2006 | Cushing et al. |
| 2007/0010915 A1 | 1/2007 | Burson et al. |
| 2007/0027990 A1 | 2/2007 | Nakaoka et al. |
| 2007/0030516 A1 | 2/2007 | Tsuji et al. |
| 2007/0050373 A1 | 3/2007 | Ahmed et al. |
| 2007/0088814 A1 | 4/2007 | Torii |
| 2007/0093265 A1 | 4/2007 | Krykun |
| 2007/0103714 A1 | 5/2007 | Ushiku |
| 2007/0127069 A1 | 6/2007 | Steele et al. |
| 2007/0180082 A1 | 8/2007 | Abraham et al. |
| 2007/0195345 A1 | 8/2007 | Martinez et al. |
| 2007/0229879 A1 | 10/2007 | Harmon et al. |
| 2007/0229880 A1 | 10/2007 | Harmon et al. |
| 2007/0229891 A1 | 10/2007 | Yanagi et al. |
| 2007/0233834 A1 | 10/2007 | Hattori et al. |
| 2007/0297009 A1 | 12/2007 | Kikuchi |
| 2008/0028029 A1 | 1/2008 | Hart et al. |
| 2008/0072254 A1 | 3/2008 | Jung et al. |
| 2008/0132252 A1 | 6/2008 | Altman et al. |
| 2008/0134316 A1 | 6/2008 | Devonshire et al. |
| 2008/0180712 A1 | 7/2008 | Selvaraj |

(56) References Cited

U.S. PATENT DOCUMENTS

| | | |
|---|---|---|
| 2008/0180726 A1 | 7/2008 | Selvaraj |
| 2008/0184162 A1 | 7/2008 | Lindsey et al. |
| 2008/0225326 A1 | 9/2008 | Kephart et al. |
| 2008/0228915 A1 | 9/2008 | Tamura |
| 2008/0239366 A1 | 10/2008 | Cyman et al. |
| 2008/0246988 A1 | 10/2008 | Ashton |
| 2008/0253667 A1 | 10/2008 | Shiraishi |
| 2009/0009802 A1 | 1/2009 | Shaw et al. |
| 2009/0027700 A1 | 1/2009 | Kim et al. |
| 2009/0033976 A1 | 2/2009 | Ding |
| 2009/0147299 A1 | 6/2009 | Tetu |
| 2009/0168100 A1 | 7/2009 | Huster |
| 2009/0174894 A1 | 7/2009 | Kamijo |
| 2009/0177381 A1 | 7/2009 | Taniguchi et al. |
| 2009/0216912 A1 | 8/2009 | Lee et al. |
| 2009/0257082 A1 | 10/2009 | Kohli et al. |
| 2009/0279126 A1 | 11/2009 | Williams |
| 2009/0287408 A1 | 11/2009 | Gerdes et al. |
| 2009/0296125 A1 | 12/2009 | Kai |
| 2009/0300226 A1 | 12/2009 | Rubio |
| 2009/0303523 A1 | 12/2009 | Moross et al. |
| 2009/0303547 A1 | 12/2009 | Kurihara |
| 2010/0020349 A1 | 1/2010 | Carroll |
| 2010/0144376 A1* | 6/2010 | Pawlecki ............... H04L 51/38 455/456.6 |
| 2010/0161832 A1 | 6/2010 | Komine |
| 2010/0169003 A1 | 7/2010 | Van Der Meer |
| 2010/0174698 A1 | 7/2010 | Odland et al. |
| 2010/0238493 A1 | 9/2010 | Sako et al. |
| 2010/0277753 A1 | 11/2010 | Shinchi |
| 2010/0290073 A1 | 11/2010 | Nuggehalli et al. |
| 2010/0309508 A1 | 12/2010 | Kamath et al. |
| 2010/0309510 A1 | 12/2010 | Hansen |
| 2011/0063668 A1 | 3/2011 | Shirai |
| 2011/0096354 A1 | 4/2011 | Liu |
| 2011/0145085 A1 | 6/2011 | Khachatrian et al. |
| 2011/0145930 A1 | 6/2011 | Gnech et al. |
| 2011/0188064 A1 | 8/2011 | Awata |
| 2011/0196731 A1 | 8/2011 | Christie et al. |
| 2011/0202914 A1 | 8/2011 | Kim et al. |
| 2011/0242576 A1 | 10/2011 | Allen et al. |
| 2011/0271197 A1 | 11/2011 | Jones et al. |
| 2011/0276986 A1 | 11/2011 | Kamath |
| 2011/0277027 A1 | 11/2011 | Hayton et al. |
| 2012/0019864 A1 | 1/2012 | Mickeleit et al. |
| 2012/0019867 A1 | 1/2012 | Prati et al. |
| 2012/0026536 A1 | 2/2012 | Shah |
| 2012/0038948 A1 | 2/2012 | Park |
| 2012/0066374 A1 | 3/2012 | Azzolin et al. |
| 2012/0069386 A1 | 3/2012 | St. Laurent et al. |
| 2012/0140285 A1 | 6/2012 | Kamath |
| 2012/0250074 A1 | 10/2012 | Kamppari et al. |
| 2012/0262753 A1 | 10/2012 | Viccari et al. |
| 2013/0038897 A1 | 2/2013 | Heckler et al. |
| 2013/0107312 A1 | 5/2013 | Venkatesh |
| 2013/0222838 A1 | 8/2013 | Kumar et al. |
| 2013/0321855 A1 | 12/2013 | Bhatia |

FOREIGN PATENT DOCUMENTS

| | | |
|---|---|---|
| CN | 101237424 | 8/2008 |
| CN | 100470513 | 3/2009 |
| CN | 101520829 | 9/2009 |
| EP | 1107512 | 6/2001 |
| EP | 1271300 | 1/2003 |
| EP | 1450515 A2 | 8/2004 |
| EP | 1646037 A2 | 4/2006 |
| EP | 1937007 A1 | 6/2008 |
| FR | 2907620 A1 | 4/2008 |
| GB | 2360914 | 10/2001 |
| JP | 2001197150 | 7/2001 |
| JP | 2001344163 | 12/2001 |
| JP | 2002112347 | 4/2002 |
| JP | 2002245003 A | 8/2002 |
| JP | 2002264431 A | 9/2002 |
| JP | 2002290416 A | 10/2002 |
| JP | 2002305521 A | 10/2002 |
| JP | 2006277197 A | 10/2006 |
| JP | 2007133817 | 5/2007 |
| KR | 20030042078 A | 5/2003 |
| KR | 20050109161 A | 11/2005 |
| KR | 20070112548 A | 11/2007 |
| KR | 20060115414 A | 11/2009 |
| WO | WO-0041064 A1 | 7/2000 |
| WO | WO-0174011 | 10/2001 |
| WO | WO-2007112334 A2 | 10/2007 |
| WO | WO-2008148576 A1 | 12/2008 |
| WO | WO-2009120154 A2 | 10/2009 |
| WO | WO-2012112159 | 8/2012 |
| WO | WO-2012147089 A1 | 11/2012 |

OTHER PUBLICATIONS

Fernandes, L. et al., "The mobile print enterprise," (Research Paper), Jan. 2012, 9 pages, available at http://www.quocirca.com/media/reports/012012/653/The%20mobile%20print%20enterprise%20Public%20Excerpt%20Jan%202012.pdf.

International Search Report & Written Opinion received in PCT Application No. PCT/US2012/044098, Feb. 20, 2013, 9 pages.

Blackberry Rocks, "HP and RIM announce Strategic Alliance to Mobilize Business on Blackberry," (Web Page), May 4, 2009, 4 pages, available at http://blackberryrocks.com/2009/05/04/hp-rim-announce-strategic-alliance-mobilize-business-blackberry/.

Blecher, Joni; "Is HPs Cloud Print the future of printing on-the-go?" http://www.letstalk.com/blog/post.htm?blogId=989; May 6, 2009, 3 pages.

Bluetooth, "Assigned Numbers—Bluetooth Baseband," 2003, 6 pages, available at http://www.bluetooth.org/foundry/assignnumb/document/baseband.

Bluetooth, "Service Discovery Application Profile," Version 1.1, Feb. 22, 2001, 18 pages.

Bluetooth, "The Bluetooth System, Core, Version 1.0 B," Service Discovery Protocol SDP, Dec. 1, 1999, XP002176975, 61 pages.

Communication Pursuant to Article 96(2) EPC issued in connection with European Patent Application No. 03022525, dated Dec. 16, 2004 (7 pages).

Equitrac, "Rules & Routing," (Brochure), 2010, 2 pages, available at http://www.equitrac.com/downloads/5379-Rules-Routing_7-10.pdf.

European Patent Office, Exam Report for EP 10845933.0 dated Apr. 17, 2014 (6 pages).

European Patent Office, Search Report for EP 10845933.0 dated Jul. 18, 2013 (7 pages).

European Search Report issued in connection with European patent application No. 03022525, dated Jan. 29, 2004.

Experts Exchange, "Setting up multiple printers using same IP address with different ports," Apr. 29, 2010, 3 pages.

Garcia, V., "HP and RIM, Increasing the value of Enterprise Software for mobile employees," (Supplemental) Hewlett-Packard (Canada) Company, May 6, 2009, 32 pages.

Hewlett-Packard Company, "HP and BlackBerry, Weaving mobility into the fabric of the enterprise," (Supplemental), WES2009, May 6, 2009, 1 page.

Hewlett-Packard Company, "HP Jornada 520, 540 and 560 Series Pocket PC and HP Deskjet 995C—Printing with Bluetooth Using the Anycom, Inc. Bluetooth Card," On-line Customer Support Documents, 2001, 5 pages.

Hewlett-Packard Development Company, "HP Universal Print Driver," Apr. 2009, 2 pages, available at http://www.governorsolutions.com/wp-content/uploads/2011/08/UPD-2009-DS-final1.pdf.

Hewlett-Packard Development Company, "HP Universal Print Driver," Solution and Feature Guide, 2009, 24 pages, available at http://h20331.www2.hp.com/Hpsub/downloads/UPD5_guide_final,%20web.pdf.

Hewlett-Packard Development Company, L.P., "Print Where Business Happens," (Brochure), Jul. 5, 2012, 2 pages.

(56) References Cited

OTHER PUBLICATIONS

Hewlett-Packard Development Company, L.P., "Service Administration Guide," HP Managed Printing Administration, Edition 1, May 2006, 78 pages.
Hewlett-Packard Development Company, L.P., "HP Driver and Queue Management Solutions," Mar. 2009, 4 pages.
Hewlett-Packard Development Company, L.P., "HP Universal Print Driver v5.7.0.16448," Release Notes, Sep. 17, 2013, 8 pages.
If It Prints, I'll Let You Know—Printer & Ink Cartridges Blog, "Print Anywhere From Your Blackberry Through HP CloudPrint," May 5, 2009, 4 pages.
International Bureau of WIPO, International Preliminary Report on Patentability received in PCT Application No. PCT/US2010/048790, Aug. 23, 2012, 7 pages.
Korean Intellectual Property Office, International Search Report & Written Opinion received in PCT Application No. PCT/US2010/021442, Sep. 30, 2010, 9 pages.
Korean Intellectual Property Office, International Search Report and Written Opinion received for PCT Application No. PCT/US2010/048790, Apr. 27, 2011, 10 pages.
LetsTalk.com—Phone Talk, "Is HPs Cloud Print the future of printing on-the-go?" (Web Site) May 6, 2009, 3 pages.
McLaughlin III, L., "Line Printer Daemon Protocol," Network Printing Working Group, Aug. 1990, 12 pages.
Microsoft, "To search for a printer," Jan. 6, 2008, 2 pages, available at http://web.archive.org/web/20080106161518/http://www.microsoft.com/resources/documentation/windows/xp/prodducs/en-us/print_find_printers.mspx?mfr=true.
Microsoft, Tech Net, "How Network Printing Works," Mar. 28, 2003, 11 pages, available at http://technet.microsoft.com/en-us/library/cc783789(WS.10,printer).aspx.
Pfeifle et al., "CUPS Printing Support," Samba, Part III, Chapter 22, Jan. 27, 2004, 46 pages, available at http://www.samba.org/samba/docs/man/Samba-HOWTO-Collection/CUPS-printing.html.
Printech, "Intelligent Print Job Routing," 2009, 1 page.
Ricoh, "doc-Q-manager, The Enterprise-wide Network Solution for Effective Print Job Management," Print Solutions for Aficio Series, Oct. 3, 2006, 6 pages, available at: http://www.ricoh-europe.com/Binary/doc_q_man_tcm101-10420.pdf.
Suffield, D., "HPLIP 2008 State of Affair," Apr. 4, 2008, 6 pages, available at http://www.linuxfoundation.org/images/6/6d/Hplip_2008.pdf.
The International Bureau of WIPO, International Preliminary Report on Patentability received in PCT Application No. PCT/US2010/021442, Aug. 2, 2012, 6 pages.
Thomas, T., "Online Printing Services Review," Mimeo, Aug. 21, 2009, 21 pages, available at http://web.archive.org/web/20090821133549/http://online-printing-services-review.toptenreviews.com/mimeo-review.html.
U.S. Appl. No. 12/881,975, Non-Final Rejection dated Aug. 21, 2012, pp. 1-33 and attachments.
Wolber, A., "Print Anywhere: Chrome, Google Apps and Cloud Print," (Web Page), Oct. 9, 2012, 10 pages.
Xerox, "Xerox® Enterprise Print Services Connecting the Remote and Mobile Workforce," Sep. 2010, 4 pages.
Xerox, "Xerox® Mobile Print," (Web Page), 2013, 2 pages, available at http://www.office.xerox.com/software-solutions/xerox-mobile-print-solution/enus.html.
Yang, Y. et al., "Offer with Choices and Accept with Delay: A Win-Win Strategy Model for Agent Based Automated Negotiation," ICIS 2009 Proceedings, 20 pages, available at http://aisel.aisnet.org/icis2009/180.
Yinping, Y., et al., "Designing an Intellectual Agent that Negotiates Tactfully with Human Counterparts: A conceptual Analysis and Modeling Framework," Proceedings of the 42nd Hawaii ICSS—2009, 10 pages.
Google, "Google Cloud Print," Google Code Labs, 2011, 5 pages.
International Preliminary Report on Patentability received in PCT Application No. PCT/US2011/038491, Dec. 12, 2013, 6 pages.
International Preliminary Report on Patentability received in PCT Application No. PCT/US2012/044098, Jan. 8, 2015, 6 pages.
International Search Report & Written Opinion received in PCT Application No. PCT/US2011/038491, Jan. 9, 2012, 9 pages.
Supplementary Partial European Search Report received in EP Application No. 11866804.5, Nov. 13, 2014, 3 pages.
European Patent Office, Extended European Search Report received in EP Application No. 11866804.5, dated Mar. 25, 2015 (11 pages).

* cited by examiner

EXPOSING NETWORK PRINTERS TO WI-FI CLIENTS

CROSS-REFERENCE TO RELATED APPLICATION

This application is a national stage application under 35 U.S.C. §371 of PCT/US2012/044098, filed Jun. 26, 2012.

BACKGROUND

The proliferation of mobile WI-FI devices such as smart phones and tablet computers is altering the way many people and corporations conduct business. Because printing remains a fundamental tool that contributes to increased productivity in various business environments, the proliferation of such mobile WI-FI devices is also influencing the way corporate enterprises provide network printing solutions to employees.

BRIEF DESCRIPTION OF THE DRAWINGS

The present embodiments will now be described, by way of example, with reference to the accompanying drawings, in which.

DETAILED DESCRIPTION

Overview

Figure 1:
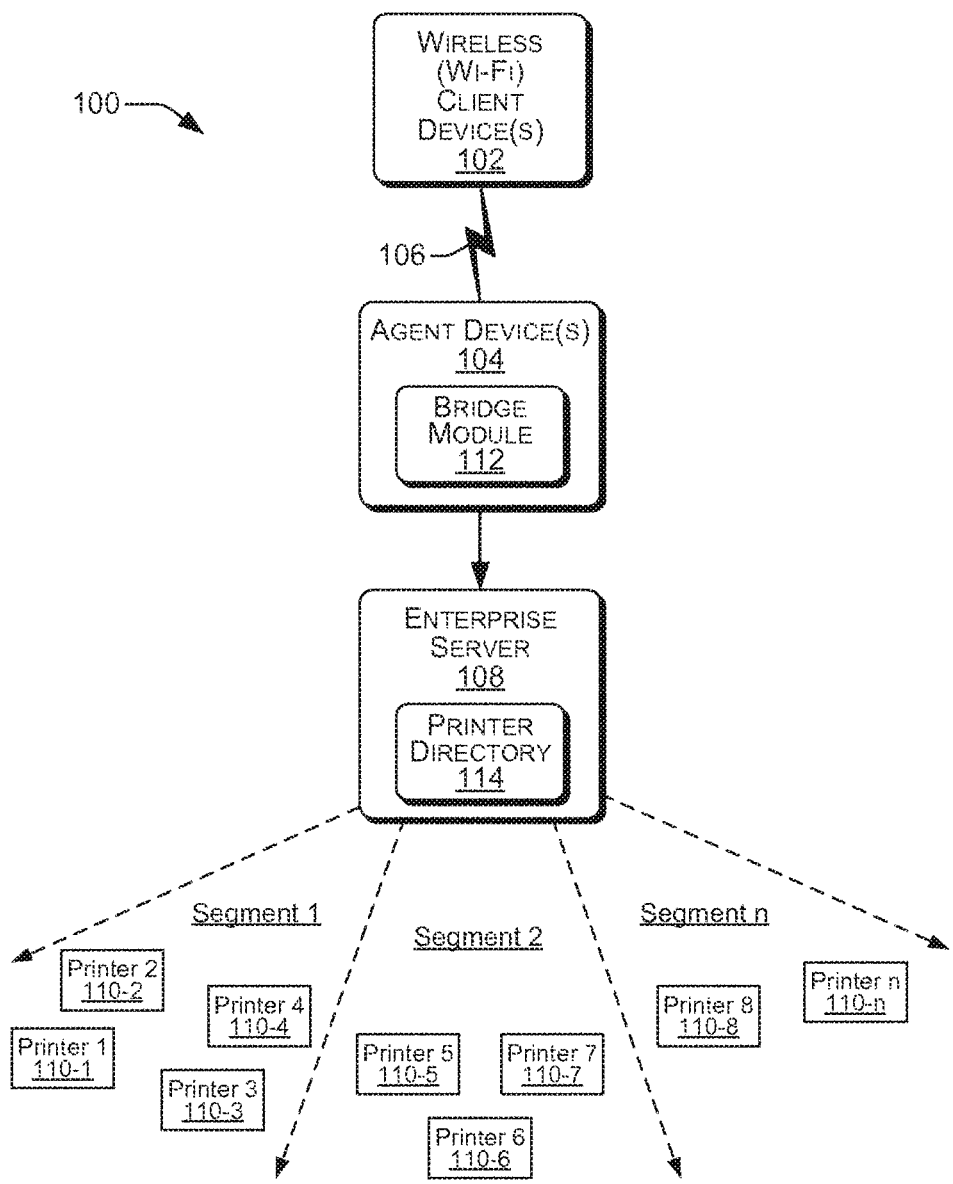
FIG. 1 shows an example environment suitable for exposing enterprise network printers to WI-FI client devices as disclosed herein, according to an embodiment.

As generally noted above, the proliferation of mobile WI-FI devices such as smart phones and tablet computers is influencing the way corporate enterprises provide network printing solutions to employees. Millions of mobile WI-FI devices have WI-FI printing capabilities embedded in their operating systems. For example, Apple devices such as the iPhone and iPad can print via WI-FI directly to any compatible printer through the AirPrint component of Apple's iOS mobile operating system. AirPrint is a printing capability embedded in Apple iOS devices that enables printing from an iOS device to a limited set of AirPrint-compatible, WI-FI printers when those printers are on the same WI-FI network as the iOS device. There are AirPrint-enabled printers available from various printer manufacturers, such as Hewlett Packard, Canon, Epson, Lexmark, and Brother. In addition, there are utilities that can be installed on iOS WI-FI client devices that will transform most other printers into AirPrint-enabled printers. The AirPrint functionality is made available to iOS application developers to enable printing from within numerous applications. Thus, the AirPrint component of iOS enables wireless printing from WI-FI client devices to WI-FI capable printers using various applications such as email applications, word processing applications, web browsing applications, photo editing applications, and so on.

However, while WI-FI print-capable client devices such as the iPhone and iPad provide wireless printing to many appropriately enabled printers, they are nonetheless limited in their ability to access many other printers. As noted above, for example, such WI-FI printing clients can only print to WI-FI capable printers when the WI-FI clients and WI-FI printers are on the same WI-FI network. In addition, the WI-FI capable printers need to be properly enabled to interact with the WI-FI client. For example, iOS WI-FI client devices can only print to AirPrint-enabled printers. Accordingly, the print capability in such WI-FI client devices cannot be directly leveraged with regard to various other groups of printers, such as non-WI-FI printers and printers not specifically enabled for the WI-FI client.

Another group of printers that is not readily accessible to WI-FI printing clients is private-cloud based printers, such as printers on private enterprise networks. WI-FI printing clients cannot readily access existing private-cloud printing solutions that manage and provide access to fleets of printers on private/corporate enterprise networks (e.g., Hewlett Packard's ePrint Enterprise solution). This is because most printers in such corporate settings are part of a managed fleet of networked printers that do not have WI-FI capability and that are not configured to respond to direct print requests from such WI-FI clients.

Thus, while there is a large and expanding base of mobile WI-FI print-capable client devices (e.g., iPhones, iPads), and many corporate environments that have private enterprise networks with large, managed fleets of networked printers, the twain have yet to meet. That is, the WI-FI print capabilities of this large installed base of mobile WI-FI clients are currently not leverageable to provide direct access to the many networked printers on private/corporate enterprise networks that employees want to print to on a daily basis as they work at corporate sites. Therefore, employees at corporate work sites wanting to print directly to nearby/local printers from WI-FI print-capable client devices, cannot do so in the same way that they normally would, for example, when printing to a properly enabled printer on a home WI-FI network. Instead, current enterprise network printing solutions involve the use of other, indirect means to achieve printing, such as emailing documents to a registered email address of a corporate printer, uploading documents to a web site, establishing VPN connections with the enterprise network, enabling printers through vendor-specific software, and so on.

Embodiments of the present disclosure leverage both the managed print capabilities of private enterprise network print solutions and the WI-FI print capabilities of mobile WI-FI clients to achieve a seamless printing experience in a private/corporate enterprise network environment that is comparable to the wireless printing experience from a WI-FI client on a home WI-FI network. An agent device (e.g., a network appliance, PC, workstation) implements a bridge between protocols of WI-FI client devices and private enterprise networks that enables the WI-FI clients to discover and print to printers on private enterprise networks as if they were WI-FI printers on a common WI-FI network. A local agent (i.e., an agent within wireless range) responds to a WI-FI client mDNS (Multicast Domain Name Service) discovery request (i.e., printer discovery request) by querying an enterprise network server for network printers that correspond with an agent ID (identification) of the local agent through which the discovery request is received. Enterprise network servers have directories or databases that include all network devices (e.g., printers, agents), along with their locations, GPS coordinates, IP addresses, and so on. Network administrators can regulate network servers to segment the network printers geographically using device GPS coordinates to ensure that the response to the discovery request includes printers that are within a distance/proximity of the local agent device. Network administrators can also manually segment the printers. The agent receives the printer segment, or list of printers, that corresponds with the agent ID from the network server, and then virtually exposes (i.e., sends wirelessly) the segment of printers in a list to the WI-FI client. The list of enterprise network printers appears to the WI-FI client as if the printers are physically available as WI-FI printers on a common WI-FI network. The exposed printer list includes additional information such as a unique printer ID and the IP address of the agent. The WI-FI printing client uses the IP address of the agent to send the print job via IPP (Internet Printing Protocol), embedding the unique printer ID. The agent redirects or forwards the IPP request, the print job, and the printer ID to the private enterprise network server, which fulfills the print request on the identified network printer.

The disclosed print solution makes the existing installed base of millions of WI-FI client devices (e.g., iOS devices) immediately applicable for use with printers on private enterprise networks, and it is vendor agnostic since it exploits the standard mDNS and IPP protocols in use by such WI-FI client devices. Existing printer fleets on such networks are immediately leveraged because the printers require no additional capabilities (e.g., like WI-FI or AirPrint capabilities) to make them accessible to the WI-FI clients. IT departments can also readily manage the printer fleets from a central location to update printer directories and perform other tasks without the need to physically access the printers. It is noted that while the disclosed print solution is described in terms of private enterprise networks (private cloud printing services), the solution is similarly applicable to other types of network scenarios including public networks, for example, to enable WI-FI clients to print in public locations.

In an example embodiment, a processor-readable medium stores code representing instructions that when executed by a processor cause the processor to receive a printer discovery request from a WI-FI client. The discovery request is received wirelessly by an agent device, and is forwarded on to an enterprise network server along with an agent identification. The instructions further cause the processor to receive from the network server, a list of printers that are associated with the agent identification. The association can be a manually defined association or a geographically defined association based on the proximity of the printers to the agent. The list of printers is then exposed to the WI-FI client.

In another example embodiment, an enterprise network comprises an enterprise server coupled to a plurality of printers. An agent device is also coupled to the server. A directory on the server associates the agent device with a segment of the printers through an agent identification. A discovery module executable on the agent device is to expose the segment of printers to a WI-FI client in response to a wireless printer discovery request from the WI-FI client.

In another example embodiment, a processor-readable medium stores code representing instructions that when executed by a processor cause the processor to receive a print request from a WI-FI client, determine a printer on an enterprise network that is nearby the WI-FI client, expose the nearby printer to the WI-FI client, and print a print job from the WI-FI client to the printer.

Illustrative Embodiments

FIG. 1 shows an example environment 100 suitable for exposing enterprise network printers to WI-FI client devices as disclosed herein, according to an embodiment of the disclosure. The environment 100 includes wireless (WI-FI) client device(s) 102 and WI-FI capable agent device(s) 104 coupled through a wireless connection 106. Agent device 104 is on a network hosted by enterprise server 108. Agent device 104 and server 108 may, in general, host various functions and/or services that are made available to WI-FI client device 102 through wireless connection 106 when the WI-FI client 102 comes within wireless range of agent device 104. One such service is a printing service that enables WI-FI client device 102 to discover and print to network printers 110 (e.g., printers 1-$n$) based on an association of such printers 110 to a given agent device 104.

WI-FI client device 102 is intended to represent any of a variety of typically mobile computing devices capable of wireless communication between WI-FI capable devices. WI-FI client devices 102 can include mobile computing devices such as, for example, cell phones, smart phones, personal digital assistants (PDAs), tablet PCs, and other handheld PCs or portable computers. However, WI-FI client devices 102 may also include other types of computing devices that are not generally considered to be mobile devices, such as, for example, laptops, desktop PCs, and workstations.

Figure 2:
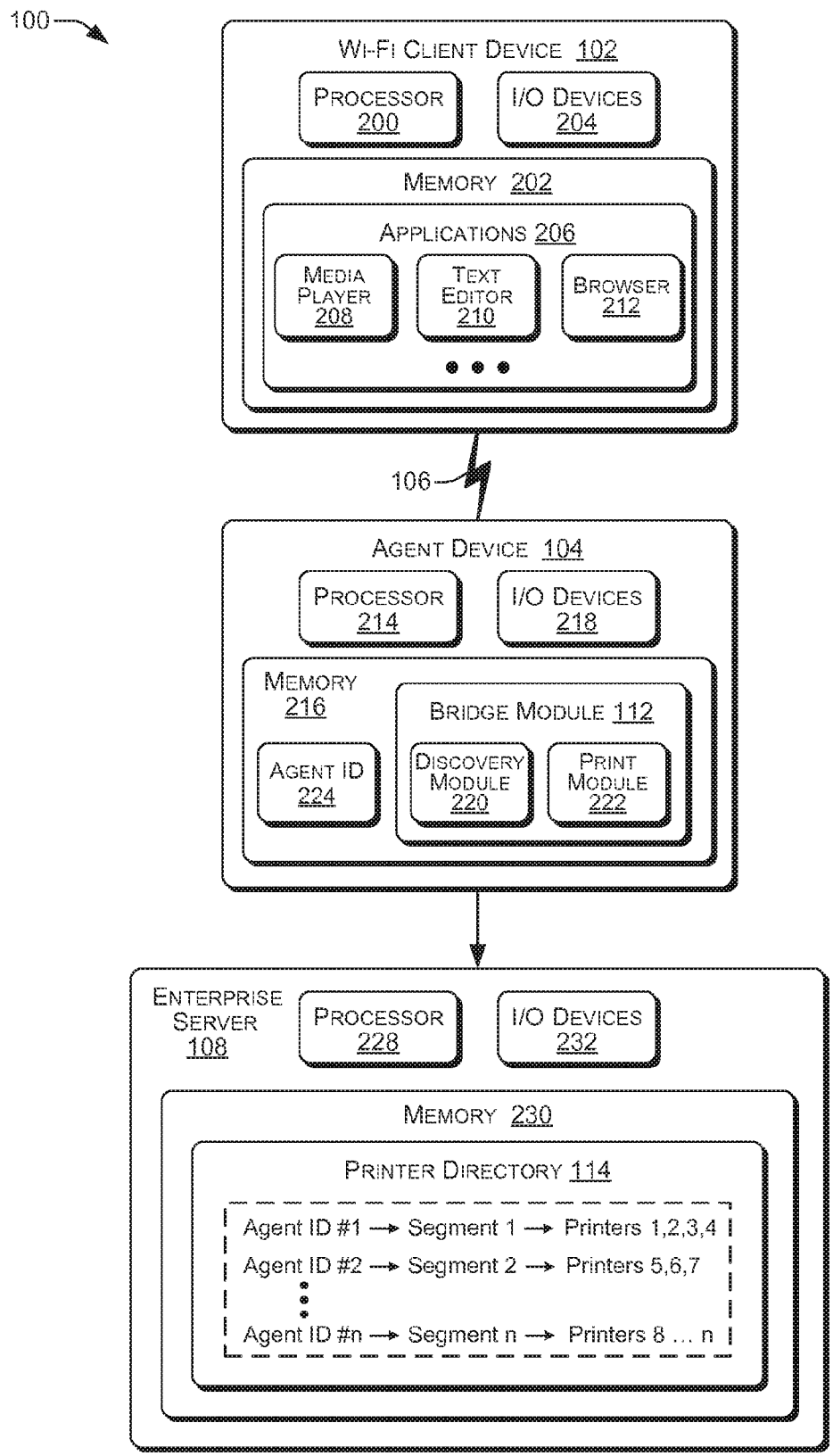
FIG. 2 shows a more detailed block diagram representation of a WI-FI client device, an agent device, and an enterprise server, according to an embodiment.

FIG. 2 shows a more detailed block diagram representation of a WI-FI client device 102, an agent device 104, and an enterprise server 108, according to an embodiment of the disclosure. As shown in FIG. 2, a WI-FI client 102 generally includes a processor (CPU) 200 and a memory 202. Memory 202 typically includes both volatile (i.e., RAM) and nonvolatile (e.g., ROM, hard disk, floppy disk, CD-ROM, etc.) memory components. The memory components of memory 202 comprise processor-readable media that provide storage of computer/processor-readable coded instructions, data structures, program modules and other data for WI-FI client 102. WI-FI client 102 also typically includes various input/output devices 204 such as a keyboard, touch pad, mouse, speaker, and display device such as a monitor or touch screen, and so on.

WI-FI client 102 may implement various application programs 206, such as a media player 208, a text editor 210, a web browser 212, other applications, and/or other instructions stored in memory 202 that are executable on processor 200 to enable transactions with a WI-FI capable agent device 104 over a wireless connection 106. Such transactions generally include the transfer, manipulation, and/or other preparation of data in electronic form by and between WI-FI client device 102 and a WI-FI capable agent 104 for purposes related to various functions and or services such as discovering and printing to network printers (e.g., printers 1-$n$) as discussed below in greater detail with regard to FIG. 3.

Referring now to both FIGS. 1 and 2, agent device 104 is a WI-FI capable device coupled to an enterprise server 108 as part of an enterprise network. Agent device 104 may be implemented as a network appliance, a desktop PC, a work station, or any other suitable computing device capable of wireless communication with WI-FI client 102. Agent device 104 generally includes a processor (CPU) 214, and a memory 216. Memory 216 typically includes both volatile (i.e., RAM) and nonvolatile (e.g., ROM, hard disk, floppy disk, CD-ROM, etc.) memory components. The memory components of memory 216 comprise processor-readable media that provide storage of computer/processor-readable coded instructions, data structures, program modules and other data for agent device 104. Agent device 104 also typically includes various input/output devices 218 such as a keyboard, touch pad, mouse, speaker, and display device such as a monitor or touch screen, and so on.

In one implementation, memory 216 includes a bridge module 112 that functions as a bridge between WI-FI client 102 and enterprise server 108 protocols, and to facilitate printing from WI-FI clients 102 to printers 110 via server 108. In general, bridge module 112 comprises instructions executable on processor 214 of agent device 104 to receive and respond to a printer discovery request from WI-FI client 102, and to forward print jobs from WI-FI client 102 to server 108 for printing on a network printer 110. More specifically, bridge module 112 comprises a discovery module 220 and a print module 222 that execute on agent 104 to handle different aspects of the printing transaction between a WI-FI client 102 and enterprise server 108.

Discovery module 220 executes on agent 104 to receive mDNS (Multicast Domain Name Server) printer discovery requests broadcast by WI-FI clients 102, and to forward the mDNS discovery requests along with an agent identification (ID) 224 to enterprise server 108. In general, an mDNS discovery request is a standard query traditionally used on small networks to locate devices on the same subnet where there is no managed DNS server. In a typical scenario, devices on the subnet that satisfy the query will respond to the query by broadcasting identification and IP address information. In the described examples, however, discovery module 220 executing on agent 104 receives and forwards the WI-FI client's printer discovery request, along with an agent ID 224, to server 108. The server 108 determines through a printer directory 114 which printer 110 (or segment of printers 110) is associated with the agent 104, through the agent ID 224. The association can be based on a manually defined association that has been stored on the server 108, or a geographically defined association stored and/or automatically generated on server 108. A manually defined association might include, for example, an association that includes a printer located in a particular corporate office location that an administrator wants to include in a certain printer segment. A geographically defined association can include printers in segments based on the proximity of the agent 104 to the printers according to the GPS coordinates of the agent and the printers. Typically, printers included in a response to a discovery request will be those printers that are physically closest to the agent 104 that receives the discovery request. However, the geographically defined associations can be readily updated in a server 108, for example, by adjusting the range of proximity desired between an agent 104 and the printers.

The server 108 forwards the printer segment, or list of printers 110, back to the agent 104, along with information such as unique printer IDs, printer locations, printer capabilities and status, agent IP address, and so on. The discovery module 220 exposes the printers to the WI-FI client 102 over wireless connection 106. For example, for an agent 104 defined by agent ID #2, as shown in FIG. 2, printer segment 2 which includes printers 5, 6, and 7, would be forwarded to the agent 104 and exposed to WI-FI client 102. A user of WI-FI client 102 can then review the exposed printer list and select which printer to use for printing a job. WI-FI client 102 then sends the print job to the agent using the agent IP address, via a standard IPP (Internet Printing Protocol) request, embedding the unique printer ID. In general, IPP is a standard protocol for submitting print jobs to a printer, checking a printer's capabilities and status, checking the status of a print job, and so on. The print module 222 on agent 104 receives the print job and printer ID address in the IPP request, and forwards them on to server 108, which implements the print job on the appropriate printer 110.

Referring again generally to FIGS. 1 and 2, enterprise server 108 is intended to represent any of a variety of enterprise network servers capable of manipulating data and other content and delivering it to, and communicating with, devices such as printers 110 and agents 104 over a network such as a private/corporate or public enterprise network. In different examples, server 108 can be implemented as any of a variety of conventional computing devices configurable to communicate with printers 110 and agents 104, including, for example, a workstation, a desktop PC, a tablet PC, combinations thereof, and so on. Server 108 generally includes a processor (CPU) 228, a memory 230 (e.g., volatile and non-volatile memory components). Memory 230 comprises processor/computer-readable media that provide for the storage of processor/computer-executable instructions in the form of various firmware, software, applications, modules, and so on. Memory 230 also stores various types of data and data structures, such as printer directory 114 that includes a listing of all printers 110 with relevant information such as geographic locations, IP addresses, capabilities, status, and so on. Printer directory 114 also includes associations that indicate which printer(s) 110 or segments/groups of printers 110 are associated with which agents 104, through agent IDs 224. As noted above, such associations can be manually and/or geographically defined associations. Server 104 may implement various application programs and/or other instructions stored in memory 230 that are executable on processor 228 to enable transactions with and between printers 110 and agents 104 to facilitate the exposure of printers 110 to WI-FI clients 102 and the printing of WI-FI client 102 print jobs on printers 110 as described herein.

As noted above, discovery module 220 on an agent 104 forwards a WI-FI client printer discovery request and the agent ID 224 to server 108, which uses printer directory 114 to determine which printer 110 (or segment of printers 110) is associated with the agent ID 224 (e.g., based on the proximity of the agent 104 with the printers). As shown in the example printer directory 114, agent devices 104 are associated through the agent IDs 224 with different segments of printers 110 on the enterprise network. Different segments of printers 110 can have any number of printers, typically on the order of between 1 and 5 printers.

Figure 3:
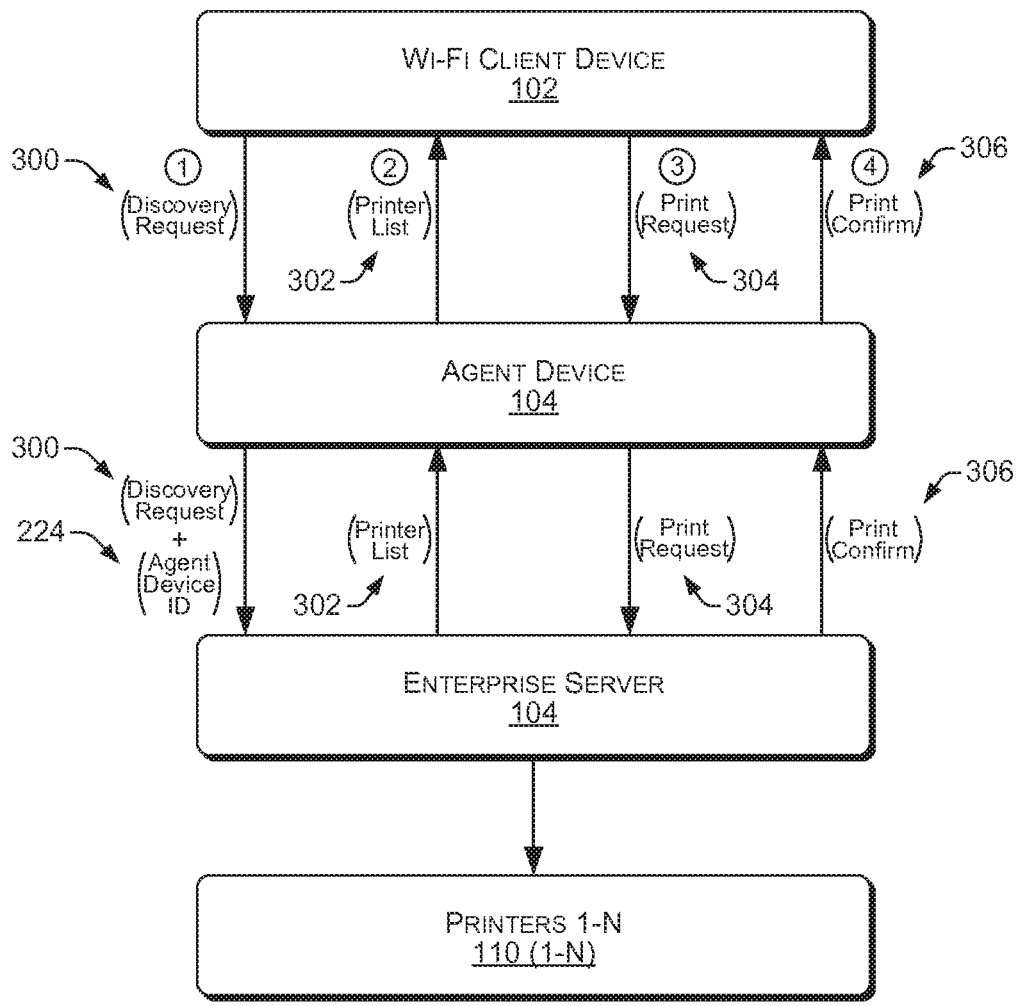
FIG. 3 shows a functional block diagram of a WI-FI client, an agent device, an enterprise server, and printers, in a printer discovery and printing transaction, according to an embodiment.

FIG. 3 shows a functional block diagram of a WI-FI client 102, an agent device 104, an enterprise server 108, and printers 110, in a printer discovery and printing transaction, according to an embodiment of the disclosure. When a WI-FI client 102 is within wireless range of an agent 104, the client 102 broadcasts a printer discovery request 300 (e.g., and mDNS discovery request) which is received by the agent 104. The agent 104 forwards the printer discovery request 300 along with an agent ID 224 to the server 108. The server 108 responds to the request 300 by sending the agent 104 a printer list 302 containing one or more printers 110 that are associated with the agent 104 through the agent ID 224. As noted above, such associations can be manually and/or geographically defined associations (e.g., via GPS proximity). For example, the agent ID 224 may be associated through the server's printer directory 114 with printer segment 1, which includes printers 1, 2, 3, and 4, as shown in FIG. 2. The printer list 302 includes relevant printer information such as printer locations, identifications, capabilities, operating status, agent IP address, and so on. The agent 104 responds to the printer discovery request 300 by exposing the printer list 302 to the WI-FI client 102 through a wireless transmission to the client 102. A user of the WI-FI client 102 can then select an appropriate printer from the list 302 on which to print a print job. The WI-FI client 102 transmits a print request 304 back to the agent 104 (e.g., an IPP print request). The print request 304 includes the print job and the agent IP address, and an embedded printer ID identifying the printer on which the print job will be printed. The agent 104 forwards the print request 304 to server 108, which causes the appropriate printer 110 to print the print job. In some implementations, the server 108 communicates a print confirmation 306 (e.g., via IPP) back to the agent 104, which is forwarded to the WI-FI client 102.

Figure 4:
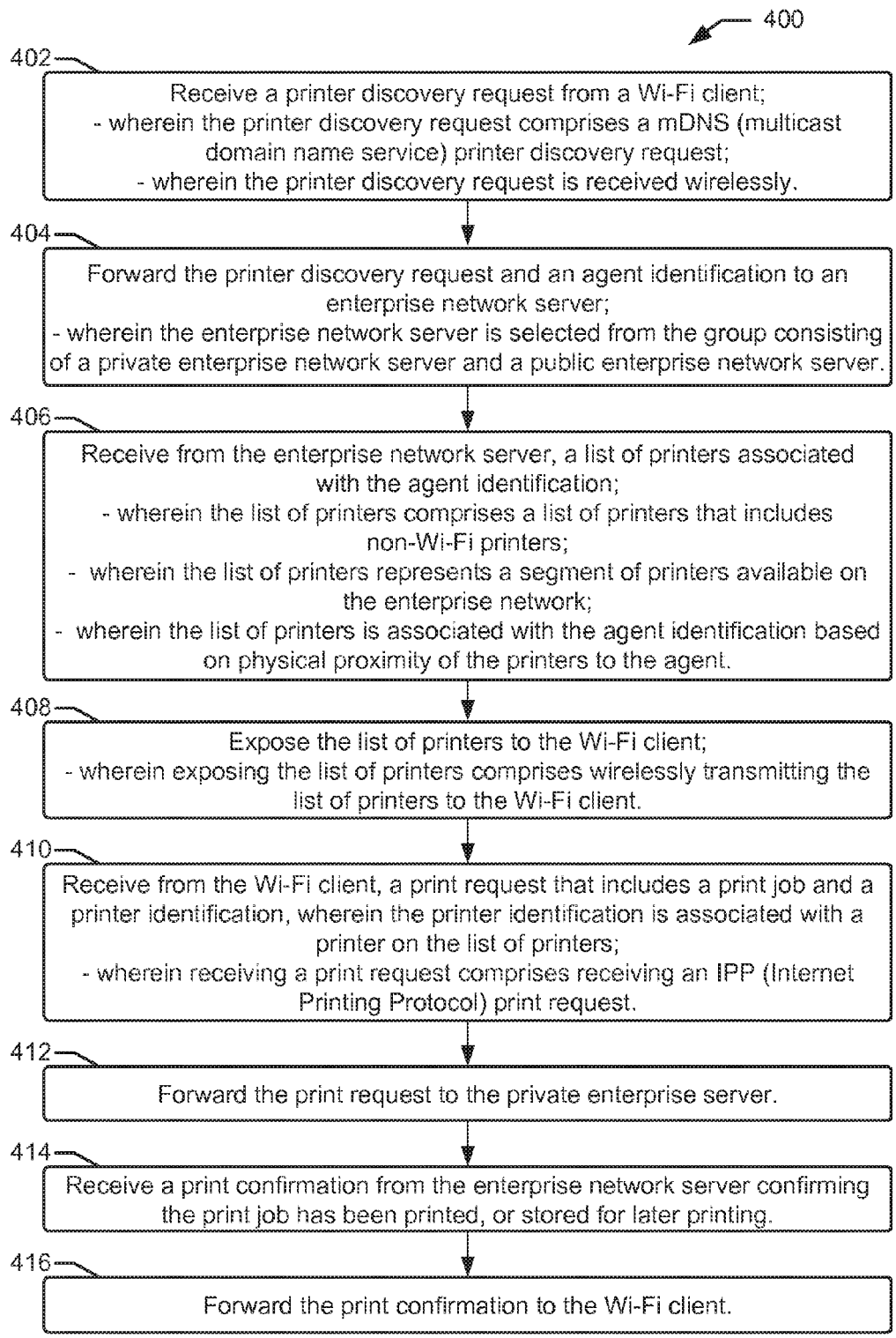
FIGS. 4 and 5, show flowcharts of example methods related to exposing enterprise network printers to WI-FI client devices, according to embodiments.
Figure 5:
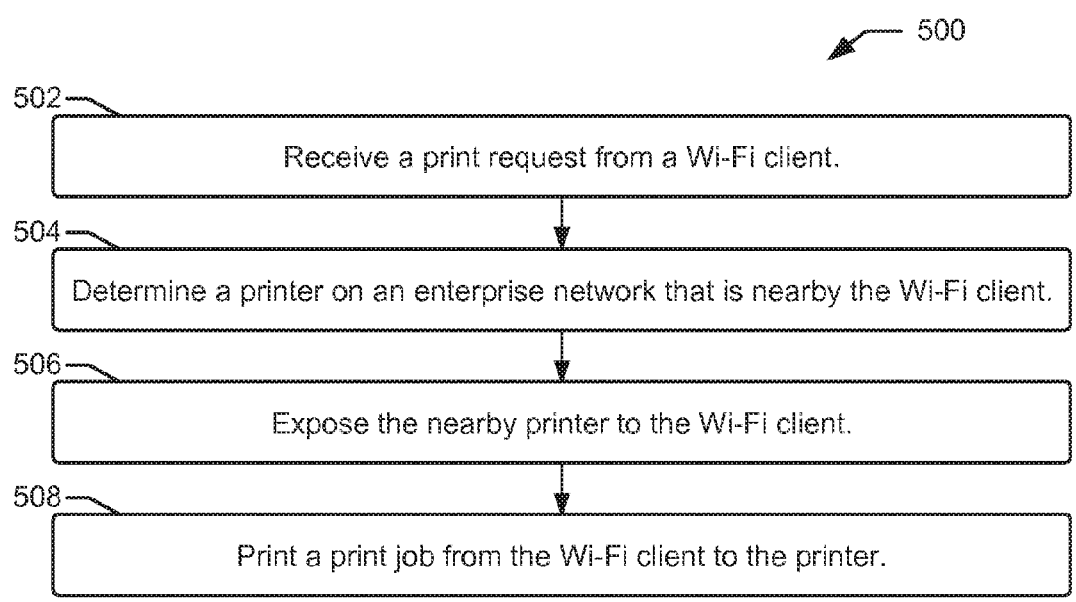

FIGS. 4 and 5, show flowcharts of example methods 400 and 500, related to exposing enterprise network printers to WI-FI client devices, according to embodiments of the disclosure. Methods 400 and 500 are associated with the embodiments discussed above with regard to FIGS. 1-3, and details of the steps shown in methods 400 and 500, can be found in the related discussion of such embodiments. The steps of methods 400 and 500, may be embodied as programming instructions stored on a computer/processor-readable medium, such as memory 216 of FIG. 2. In one example, the implementation of the steps of methods 400 and 500, is achieved by the reading and execution of such programming instructions by a processor, such as processor 214 of FIG. 2. Methods 400 and 500, may include more than one implementation, and different implementations of methods 400 and 500, may not employ every step presented in the respective flowcharts. Therefore, while steps of methods 400 and 500, are presented in a particular order within their respective flowcharts, the order of their presentation is not intended to be a limitation as to the order in which the steps may actually be implemented, or as to whether all of the steps may be implemented. For example, one implementation of method 400 might be achieved through the performance of a number of initial steps, without performing one or more subsequent steps, while another implementation of method 400 might be achieved through the performance of all of the steps.

Method 400 of FIG. 4, begins at block 402, with receiving a printer discovery request from a WI-FI client. In one example, the printer discovery request comprises a mDNS (multicast domain name service) printer discovery request. In another example, the printer discovery request is received wirelessly from the client. At block 404, the method 400 continues with forwarding the printer discovery request and an agent identification to an enterprise network server. In one example, the enterprise network server comprises a private enterprise network server and in another example the enterprise network server comprises a public enterprise network server.

Continuing at block 406 of method 400, a list of printers associated with the agent identification is received from the enterprise network server. In one example, the list of printers comprises a list of printers that includes non-WI-FI printers. In another example, the list of printers represents a segment of printers available on the enterprise network. In another example, the list of printers is associated with the agent identification based on the physical proximity of the printers to the agent. At block 408, the method 400 continues with exposing the list of printers to the WI-FI client. In one example, exposing the list of printers comprises wirelessly transmitting the list of printers to the WI-FI client.

Continuing at block 410 of method 400, a print request that includes a print job and a printer identification is received from the WI-FI client. The printer identification is associated with a printer on the list of printers. In one example, receiving a print request comprises receiving an IPP (Internet Printing Protocol) print request. At block 412, method 400 continues with forwarding the print request to the private enterprise server. The method 400 continues with receiving a print confirmation from the enterprise network server confirming the print job has been printed on the appropriate printer associated with the printer identification, or that the print job has been stored in a print queue associated with the printer identification, to be printed at a later time, as shown at block 414.

The method 400 concludes with forwarding the print confirmation to the WI-FI client, as shown at block 416.

Method 500 of FIG. 5, begins at block 502, with receiving a print request from a WI-FI client. The print request is received, for example by an agent device capable of wireless communication with the WI-FI client. At block 504 of method 500, a printer on an enterprise network that is nearby the WI-FI client is determined. The nearby printer is determined, in one example, based on an identification of the agent that received the print request. At block 506 of method 500, the nearby printer is exposed to the WI-FI client, and at block 508, a print job from the WI-FI client is printed on the printer.

What is claimed is:

1. A non-transitory processor-readable medium storing code representing instructions that when executed by a processor in an agent device cause the agent device to:
   receive a printer discovery request from a WI-FI client;
   forward the printer discovery request and an agent identification to an enterprise network server, the agent identification identifying the agent device;
   receive, from the enterprise network server in response to the printer discovery request, a list of printers associated with the agent identification, the printers in the list of printers comprising a non-WI-FI printer accessible by the WI-FI client through the agent device; and
   expose the list of printers to the WI-FI client.

2. The non-transitory processor-readable medium of claim 1, wherein the instructions further cause the agent device to:
   receive, from the WI-FI client, a print request that includes a print job and a printer identification, wherein the printer identification identifies the non-WI-FI printer in the list of printers; and
   forward the print request to the enterprise network server.

3. The non-transitory processor-readable medium of claim 2, wherein the instructions further cause the agent device to:
   receive a print confirmation from the enterprise network server confirming the print job has been printed, or has been stored in a print queue for later printing, on the non-WI-FI printer; and
   forward the print confirmation to the WI-FI client.

4. The processor-readable medium of claim 2, wherein receiving the print request comprises receiving an IPP (Internet Printing Protocol) print request.

5. The processor-readable medium of claim 1, wherein the list of printers is associated with the agent identification based on an association selected from the group consisting of a manually defined association and a geographically defined association.

6. The processor-readable medium of claim 1, wherein the list of printers represents a segment of printers available on an enterprise network to which the enterprise network server is connected.

7. The processor-readable medium of claim 1, wherein:
   receiving the printer discovery request comprises receiving the printer discovery request wirelessly from the WI-FI client; and
   exposing the list of printers comprises wirelessly transmitting the list of printers to the WI-FI client.

8. The processor-readable medium of claim 1, wherein the enterprise network server is selected from the group consisting of a private enterprise network server and a public enterprise network server.

9. The non-transitory processor-readable medium of claim 1, wherein the non-WI-FI printer is without WI-FI capability and is unable to communicate over a WI-FI network over which the WI-FI client communicates.

10. The non-transitory processor-readable medium of claim 9, wherein the printer discovery request is received from the WI-FI client over the WI-FI network.

11. The non-transitory processor-readable medium of claim 1, wherein the printers of the list of printers are part of a subset of printers of an enterprise network to which the enterprise network server is connected, the subset of printers determined as being in geographic proximity to the agent device.

12. A non-transitory processor-readable medium storing code representing instructions that when executed by a processor cause the processor to:
receive a printer discovery request from a WI-FI client, wherein receiving the printer discovery request from the WI-FI client comprises receiving a mDNS (multicast domain name service) printer discovery request;
forward the printer discovery request and an agent identification to an enterprise network server;
receive, from the enterprise network server, a list of printer associated with the agent identification; and
expose the list of printers to the WI-FI client.

13. The processor-readable medium of claim 12, wherein receiving the list of printers comprises receiving the list of printers that includes non WI-FI printers.

14. An agent device comprising:
at least one processor; and
machine-readable instructions executable on the at least one processor to:
receive a printer discovery request from a WI-FI client over a WI-FI network; and
in response to the printer discovery request, provide, to the WI-FI client, identification of a plurality of printers accessible by the WI-FI client, the plurality of printers connected to an enterprise network and comprising a printer without WI-FI capability.

15. The agent device of claim 14, further comprising:
print instructions executable on the at least one processor to receive a print request from the WI-FI client and forward the print request to a server connected to the enterprise network, the print request including a print job and a printer identification identifying the printer without WI-FI capability.

16. The agent device of claim 15, wherein the print request requests printing of the print job at the printer without WI-FI capability, the printer without WI-FI capability unable to communicate over the WI-FI network.

17. A method comprising:
receiving, by an agent device comprising a processor, a print request from a WI-FI client over a WI-FI network;
in response to the print request, receiving, by the agent device, an identification of a non-WI-FI printer on an enterprise network that is nearby the WI-FI client, the non-WI-FI printer without capability to communicate over the WI-FI network;
exposing, by the agent, the non-WI-FI printer to the WI-FI client; and
causing, by the agent device, printing of a print job from the WI-FI client to the non-WI-FI printer.

18. The method of claim 17, wherein the identification of the printer is received from an enterprise network server on the enterprise network.

* * * * *